United States Patent

Yu et al.

(10) Patent No.: US 9,094,689 B2
(45) Date of Patent: Jul. 28, 2015

(54) MOTION VECTOR PREDICTION DESIGN SIMPLIFICATION

(75) Inventors: Yue Yu, San Diego, CA (US); Krit Panusopone, San Diego, CA (US); Limin Wang, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 400 days.

(21) Appl. No.: 13/536,416

(22) Filed: Jun. 28, 2012

(65) Prior Publication Data

US 2013/0003851 A1    Jan. 3, 2013

Related U.S. Application Data

(60) Provisional application No. 61/504,085, filed on Jul. 1, 2011, provisional application No. 61/508,844, filed on Jul. 18, 2011, provisional application No. 61/557,411, filed on Nov. 8, 2011, provisional application No. 61/557,418, filed on Nov. 9, 2011.

(51) Int. Cl.
| | |
|---|---|
| *H04N 7/36* | (2006.01) |
| *H04N 19/577* | (2014.01) |
| *H04N 19/105* | (2014.01) |
| *H04N 19/52* | (2014.01) |

(Continued)

(52) U.S. Cl.
CPC .......... *H04N 19/577* (2014.11); *H04N 19/105* (2014.11); *H04N 19/159* (2014.11); *H04N 19/176* (2014.11); *H04N 19/52* (2014.11)

(58) Field of Classification Search
CPC ................. H04N 19/00696; H04N 19/00024; H04N 7/26212; H04N 19/00218; H04N 19/00721; H04N 19/00278; H04N 19/105; H04N 19/159; H04N 19/176; H04N 19/52; H04N 19/577
USPC ................................................... 375/240.16
See application file for complete search history.

(56) References Cited

U.S. PATENT DOCUMENTS

| | | | |
|---|---|---|---|
| 4,924,310 A | 5/1990 | von Brandt | |
| 5,148,269 A | 9/1992 | de Haan et al. | |

(Continued)

FOREIGN PATENT DOCUMENTS

| | | |
|---|---|---|
| EP | 0634873 | 1/1995 |
| EP | 0979011 | 2/2000 |

(Continued)

OTHER PUBLICATIONS

Zheng et al, Extended Motion Vector Prediction for Bi predictive Mode, Mar. 2011.*

(Continued)

*Primary Examiner* — Shan Elahi
(74) *Attorney, Agent, or Firm* — Young Basile Hanlon & MacFarlane P.C.

(57) ABSTRACT

In one embodiment, a method receives a unit of video content. The unit of video content is coded in a bi-prediction mode. A motion vector predictor candidate set is determined for a first motion vector for the unit. The method then determines a first motion vector predictor from the motion vector prediction candidate set for the first motion vector and calculates a second motion vector predictor for a second motion vector for the unit of video content. The second motion vector predictor is calculated based on the first motion vector or the first motion vector predictor.

20 Claims, 12 Drawing Sheets

(51) Int. Cl.
*H04N 19/159* (2014.01)
*H04N 19/176* (2014.01)

(56) References Cited

U.S. PATENT DOCUMENTS

| | | | |
|---|---|---|---|
| 5,337,086 A | 8/1994 | Fujinami | |
| 5,398,068 A | 3/1995 | Liu et al. | |
| 5,461,708 A | 10/1995 | Kahn | |
| 5,512,952 A | 4/1996 | Iwamura | |
| 5,550,964 A | 8/1996 | Davoust | |
| 5,581,678 A | 12/1996 | Kahn | |
| 5,610,658 A | 3/1997 | Uchida et al. | |
| 5,611,034 A | 3/1997 | Makita | |
| 5,731,840 A | 3/1998 | Kikuchi et al. | |
| 5,742,710 A | 4/1998 | Hsu et al. | |
| 5,886,742 A | 3/1999 | Hibi et al. | |
| 5,987,180 A | 11/1999 | Reitmeier | |
| 5,991,447 A | 11/1999 | Eifrig et al. | |
| 6,005,980 A | 12/1999 | Eifrig et al. | |
| 6,011,870 A | 1/2000 | Jeng et al. | |
| 6,014,181 A | 1/2000 | Sun | |
| 6,058,143 A * | 5/2000 | Golin | 375/240.16 |
| 6,272,179 B1 | 8/2001 | Kadono | |
| 6,289,049 B1 | 9/2001 | Kim et al. | |
| 6,359,929 B1 | 3/2002 | Boon | |
| 6,381,277 B1 | 4/2002 | Chun et al. | |
| 6,473,460 B1 * | 10/2002 | Topper | 375/240.16 |
| 6,507,617 B1 | 1/2003 | Karczewicz et al. | |
| 6,711,211 B1 | 3/2004 | Lainema | |
| 6,735,249 B1 | 5/2004 | Karczewicz et al. | |
| 6,912,255 B2 | 6/2005 | Drezner et al. | |
| 7,002,580 B1 | 2/2006 | Aggala et al. | |
| 7,418,147 B2 | 8/2008 | Kamaci et al. | |
| 7,463,685 B1 | 12/2008 | Haskell et al. | |
| 7,580,456 B2 | 8/2009 | Li et al. | |
| 7,581,168 B2 | 8/2009 | Boon | |
| 7,606,310 B1 | 10/2009 | Ameres et al. | |
| 7,705,847 B2 | 4/2010 | Helfman et al. | |
| 7,978,770 B2 | 7/2011 | Luo et al. | |
| 8,005,144 B2 | 8/2011 | Ji et al. | |
| 8,006,194 B2 | 8/2011 | Berger et al. | |
| 8,130,840 B2 * | 3/2012 | Mishima et al. | 375/240.16 |
| 8,208,540 B2 * | 6/2012 | Cote | 375/240.12 |
| 8,345,758 B2 * | 1/2013 | Jeon | 375/240.15 |
| 8,351,505 B2 * | 1/2013 | Jeon | 375/240.15 |
| 8,451,904 B2 | 5/2013 | Reznik et al. | |
| 8,594,200 B2 * | 11/2013 | Chang et al. | 375/240.16 |
| 8,762,441 B2 | 6/2014 | Reznik | |
| 8,787,459 B2 * | 7/2014 | Wang | 375/240.13 |
| 8,867,618 B2 * | 10/2014 | Pandit et al. | 375/240.16 |
| 8,879,634 B2 | 11/2014 | Reznik | |
| 8,891,626 B1 | 11/2014 | Bankoski et al. | |
| 8,908,767 B1 | 12/2014 | Holmer | |
| 2002/0031272 A1 | 3/2002 | Bagni et al. | |
| 2002/0064228 A1 | 5/2002 | Sethuraman et al. | |
| 2002/0118754 A1 | 8/2002 | Choi | |
| 2003/0072374 A1 | 4/2003 | Sohm | |
| 2004/0001546 A1 * | 1/2004 | Tourapis et al. | 375/240.12 |
| 2004/0028131 A1 | 2/2004 | Ye et al. | |
| 2004/0066848 A1 * | 4/2004 | Jeon | 375/240.15 |
| 2004/0218674 A1 * | 11/2004 | Kondo et al. | 375/240.16 |
| 2004/0258155 A1 | 12/2004 | Lainema et al. | |
| 2005/0117646 A1 * | 6/2005 | Joch et al. | 375/240.16 |
| 2005/0123282 A1 * | 6/2005 | Novotny et al. | 386/111 |
| 2005/0226333 A1 | 10/2005 | Suzuki et al. | |
| 2005/0243926 A1 | 11/2005 | Hubrich et al. | |
| 2005/0254719 A1 | 11/2005 | Sullivan | |
| 2006/0114989 A1 | 6/2006 | Panda | |
| 2006/0209961 A1 | 9/2006 | Han et al. | |
| 2006/0268166 A1 * | 11/2006 | Bossen et al. | 348/390.1 |
| 2006/0294171 A1 * | 12/2006 | Bossen et al. | 708/300 |
| 2007/0014358 A1 * | 1/2007 | Tourapis et al. | 375/240.15 |
| 2007/0110156 A1 * | 5/2007 | Ji et al. | 375/240.15 |
| 2007/0286280 A1 * | 12/2007 | Saigo et al. | 375/240.12 |
| 2008/0025390 A1 | 1/2008 | Shi et al. | |
| 2008/0037639 A1 * | 2/2008 | Jeon | 375/240.15 |
| 2008/0043845 A1 | 2/2008 | Nakaishi | |
| 2008/0056354 A1 | 3/2008 | Sun et al. | |
| 2008/0084931 A1 | 4/2008 | Kondo et al. | |
| 2008/0111722 A1 * | 5/2008 | Reznik | 341/67 |
| 2008/0240242 A1 | 10/2008 | Lainema | |
| 2008/0253459 A1 | 10/2008 | Ugur et al. | |
| 2008/0291285 A1 | 11/2008 | Shimizu | |
| 2008/0310514 A1 | 12/2008 | Osamoto et al. | |
| 2008/0317127 A1 * | 12/2008 | Lee et al. | 375/240.16 |
| 2009/0016439 A1 | 1/2009 | Thoreau et al. | |
| 2009/0067497 A1 * | 3/2009 | Jeon | 375/240.15 |
| 2009/0074062 A1 * | 3/2009 | Jeon | 375/240.15 |
| 2009/0074067 A1 * | 3/2009 | Jeon | 375/240.15 |
| 2009/0110077 A1 | 4/2009 | Amano et al. | |
| 2009/0125538 A1 * | 5/2009 | Rosenzweig et al. | 707/101 |
| 2009/0129474 A1 * | 5/2009 | Pandit et al. | 375/240.16 |
| 2009/0290643 A1 * | 11/2009 | Yang | 375/240.16 |
| 2010/0079624 A1 | 4/2010 | Miyasako | |
| 2010/0284469 A1 | 11/2010 | Sato et al. | |
| 2010/0322301 A1 * | 12/2010 | Karkkainen | 375/240.01 |
| 2011/0026820 A1 | 2/2011 | Strom et al. | |
| 2011/0096837 A1 | 4/2011 | Demos | |
| 2011/0110428 A1 * | 5/2011 | Chang et al. | 375/240.16 |
| 2011/0170597 A1 | 7/2011 | Shi et al. | |
| 2011/0170602 A1 * | 7/2011 | Lee et al. | 375/240.16 |
| 2011/0188583 A1 | 8/2011 | Toraichi et al. | |
| 2011/0261886 A1 | 10/2011 | Suzuki et al. | |
| 2011/0293010 A1 | 12/2011 | Jeong et al. | |
| 2012/0014440 A1 * | 1/2012 | Segall et al. | 375/240.12 |
| 2012/0075535 A1 | 3/2012 | Van Beek | |
| 2012/0134415 A1 * | 5/2012 | Lin et al. | 375/240.16 |
| 2012/0294363 A1 * | 11/2012 | Lee et al. | 375/240.15 |
| 2012/0300845 A1 | 11/2012 | Endresen et al. | |
| 2013/0022127 A1 * | 1/2013 | Park et al. | 375/240.16 |
| 2013/0089149 A1 * | 4/2013 | Hayashi et al. | 375/240.16 |
| 2013/0089266 A1 * | 4/2013 | Yang et al. | 382/238 |
| 2013/0114725 A1 | 5/2013 | Lou et al. | |
| 2014/0092975 A1 | 4/2014 | Yu et al. | |

FOREIGN PATENT DOCUMENTS

| | | |
|---|---|---|
| EP | 1091592 | 4/2001 |
| EP | 1672926 A1 | 6/2006 |
| WO | WO9941912 | 8/1999 |

OTHER PUBLICATIONS

Zheng, Y et al, Unified Motion Vector Predictor Selection for Merge and AMVP, Mar. 2011.*
Wiegand et al., "WD2: Working Draft 2 of High-Efficiency Video Coding," Joint Collaborative Team on Video Coding, JCTVC-D503, Jan. 2011.
McCann et al., "Video Coding Technology Proposal by Samsung (and BBC)," Joint Collaborative Team on Video Coding, 1st Meeting, Dresden, Germany, JCTVC-A124, Apr. 15-23, 2010.
Bossen, F., "Common test conditions and software reference configurations," Joint Collaborative Team on Video Coding, JCTVC-D600, Jan. 2011.
Zheng et al., "Unified Motion Vector Predictor Selection for Merge and AMVP," Joint Collaborative Team on Video Coding, Geneva, Mar. 2011.
Zheng et al., "Extended Motion Vector Prediction for Bi Predictive Mode," Joint Collaborative Team on Video Coding, Geneva, Mar. 2011.
PCT Search Report & Written Opinion, RE: Application #PCT/US2012/044726; Sep. 27, 2012.
Jianghong Guo et al., A Novel Criterion for Block Matching Motion Estimation, Oct. 123, 1998, IEEE, vol. 1 pp. 841-844.
Bankoski et al. "VP8 Data Format and Decoding Guide; draft-bankoski-vp8-bitstream-02" Network Working Group. Internet-Draft, May 18, 2011, 288 pp.
Chen, Michael C., et al.; "Design and Optimization of a Differentially Coded Variable Block Size Motion Compensation System", IEEE 1996, 4 pp.
Chen, Xing C., et al.; "Quadtree Based Adaptive Lossy Coding of Motion Vectors", IEEE 1996, 4 pp.

(56) References Cited

OTHER PUBLICATIONS

Ebrahimi, Touradj, et al.; "Joint motion estimation and segmentation for very low bitrate video coding", SPIE vol. 2501, 1995, 12 pp.
Guillotel, Philippe, et al.; "Comparison of motion vector coding techniques", SPIE vol. 2308, 1994, 11 pp.
Implementors'Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
ISR and Written opinion of the International Searching Authoriy for International Application No. PCT/US13/24773, dated Apr. 29, 2013, 13 pages.
ISR, "ISR Search Report and Written Opinion of the International Searching Authority" for International Application No. ISR/US2012/063434 dated Feb. 12, 2013, 15 pages.
ISR, "ISR Search Report and Written Opinion of the International Searching Authority" for International Application No. ISR/US2013/060100 dated Nov. 21, 2013, 11 pages.
Karcxewicz (Qualcomm) M et al., "Video coding technology proposal by Qualcomm," 1. JCT-VC Meeting;; 15-4-2010-23-4-2010; Dresden; (Joint Collaborative Team on Video Coding of ISO/IEC JTC1/SC29/WG11 and ITU-T SG16); URL: http://wftp3.itu.int/av-arch/jctvc-site/, Apr. 16, 2010, XP030007586, ISSN:0000-0049.
Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.
Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.
Liu, Bede, et al.; "A simple method to segment motion field for video coding", SPIE vol. 1818, Visual Communications and Image Processing 1992, 10 pp.
Liu, Bede, et al.; "New Fast Algorithms for the Estimation of Block Motion Vectors", IEEE Transactions on Circuits and Systems for Video Technology, vol. 3, No. 2, Apr. 1993, 10 pp.
Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.
Martin, Graham R., et al.; "Reduced Entropy Motion Compensation Using Variable Sized Blocks", SPIE vol. 3024, 1997, 10 pp.
Nicolas, H., et al.; "Region-based motion estimation using deterministic relaxation schemes for image sequence coding", IEEE 1992, 4 pp.
Nokia, Inc., Nokia Research Center, "MVC Decoder Description", Telecommunication Standardization Sector, Study Period 1997-2000, Geneva, Feb. 7, 2000, 99 pp.
Orchard, Michael T.; "Exploiting Scene Structure in Video Coding", IEEE 1991, 5 pp.
Orchard, Michael T.; "Predictive Motion-Field Segmentation for Image Sequence Coding", IEEE Transactions on Circuits and Systems for Video Technology, vol. 3, No. 1, Feb. 1993, 17 pp.
Overview; VP7 Data Format and Decoder. Version 1.5. On2 Technologies, Inc. Dated Mar. 28, 2005.
Park, Jun Sung, et al., "Selective Intra Prediction Mode Decision for H.264/AVC Encoders", World Academy of Science, Engineering and Technology 13, (2006).
Peng, Qiang, T. Yang, and C Zhu, Block-based temporal error concealment for video packet using motion vector extrapolation', 2002 International Conference on Communications, Circuits and Systems and West Sino Exposition Proceedings, 10-14 vol. 1:2.
Schiller, H., et al.; "Efficient Coding of Side Information in A Low Bitrate Hybrid Image Coder", Signal Processing 19 (1990) Elsevier Science Publishers B.V. 61-73, 13 pp.
Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.
Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.
Series H: Audiovisual and Multimedia Systems; Infrastructure of audiovisual services—Coding of moving video. H.264. Advanced video coding for generic audiovisual services. International Telecommunication Union. Version 11. Dated Mar. 2009.
Series H: Audiovisual and Multimedia Systems; Infrastructure of audiovisual services—Coding of moving video. H.264. Advanced video coding for generic audiovisual services. International Telecommunication Union. Version 12. Dated Mar. 2010.
Series H: Audiovisual and Multimedia Systems; Infrastructure of audiovisual services—Coding of moving video. H.264. Amendment 2: New profiles for professional applications. International Telecommunication Union. Dated Apr. 2007.
Series H: Audiovisual and Multimedia Systems; Infrastructure of audiovisual services—Coding of moving video. H.264. Advanced coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
Steliaros, Michael K., et al.; "Locally-accurate motion estimation for object-based video coding", SPIE vol. 3309, 1997, 11 pp.
Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.
Strobach, Peter; "Tree-Structured Scene Adaptive Coder", IEEE Transactions on Communications, vol. 38, No. 4, Apr. 1990, 10 pp.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.
Wiegand, Thomas, et al.; "Long-Term Memory Motion-Compensated Prediction", Publication Unknown, Date Unknown, 15 pp.
Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.
Wright, R. Glenn, et al.; "Multimedia—Electronic Technical Manual for ATE", IEEE 1996, 3 pp.
Zhang, Kui, et al.; "Variable Block Size Video Coding With Motion Prediction and Motion Segmentation", SPIE vol. 2419, 1995, 9 pp.

* cited by examiner

MOTION VECTOR PREDICTION DESIGN SIMPLIFICATION

CROSS REFERENCE TO RELATED APPLICATIONS

The present application claims priority to:

U.S. Provisional App. No. 61/504,085 for "Method for Simplification of MVP Design for HEVC" filed Jul. 1, 2011;

U.S. Provisional App. No. 61/508,844 for "Simplification of MVP Design for HEVC" filed Jul. 18, 2011;

U.S. Provisional App. No. 61/557,411 for "Simplification of MVP Design for HEVC" filed Nov. 8, 2011; and U.S. Provisional App. No. 61/557,418 for "Parallel Friendly MVP Candidate Calculation for HEVC" filed Nov. 9, 2011, the contents of all of which are incorporated herein by reference in their entirety.

BACKGROUND

Motion Vector Prediction Design

Video compression systems employ block processing for most of the compression operations. A block is a group of neighboring pixels and may be treated as one coding unit in terms of the compression operations. Theoretically, a larger coding unit is preferred to take advantage of correlation among immediate neighboring pixels. Various video compression standards, e.g., Motion Picture Expert Group (MPEG)-1, MPEG-2, and MPEG-4, use block sizes of 4×4, 8×8, and 16×16 (referred to as a macroblock (MB)).

High efficiency video coding (HEVC) is also a block-based hybrid spatial and temporal predictive coding scheme. HEVC partitions an input picture into square blocks referred to as largest coding units (LCUs) as shown in FIG. 1. Unlike prior coding standards, the LCU can be as large as 128×128 pixels. Each LCU can be partitioned into smaller square blocks called coding units (CUs). FIG. 2 shows an example of an LCU partition of CUs. An LCU 100 is first partitioned into four CUs 102. Each CU 102 may also be further split into four smaller CUs 102 that are a quarter of the size of the CU 102. This partitioning process can be repeated based on certain criteria, such as limits to the number of times a CU can be partitioned may be imposed. As shown, CUs 102-1, 102-3, and 102-4 are a quarter of the size of LCU 100. Further, a CU 102-2 has been split into four CUs 102-5, 102-6, 102-7, and 102-8.

Each CU 102 may include one or more prediction units (PUs). FIG. 3 shows an example of a CU partition of PUs. The PUs may be used to perform spatial prediction or temporal prediction. A CU can be either spatially or temporally predictive coded. If a CU is coded in intra mode, each PU of the CU can have its own spatial prediction direction. If a CU is coded in inter mode, each PU of the CU can have its own motion vector(s) and associated reference picture(s).

In HEVC, motion vectors (MVs) are predictively coded. For a current PU having one current motion vector and an associated reference index, a motion vector predictor (MVP) is derived from motion vectors of spatially neighboring or temporally co-located PUs of the current PU. The difference between the current motion vector and the MVP is then determined and coded. This reduces overhead as only the difference is sent instead of information for the current motion vector.

Advanced motion vector prediction (AMVP) proposes to select the best MVP for a current motion vector from a candidate set of MVPs. The candidate set of MVPs for the current motion vector of the current PU is composed of motion vectors of spatial neighboring and co-located PUs. The candidate set of MVPs may be reduced by removing duplicated MVP candidates. An index indicating the selected MVP candidate, mvpIdx, may be transmitted in the bitstream to indicate the selected MVP.

In bi-prediction mode, the current PU may have two motion vectors, a motion vector MV0 for a reference list 0 and a motion vector MV1 for a reference list 1. The corresponding reference pictures pointed to by the two motion vectors MV0 and MV1 are indexed by reference list 0 and reference list 1, respectively. To code the two motion vectors, two MVP candidate sets are first formed. One candidate set is for the list 0 motion vector and the other candidate set is for the list 1 motion vector. The same procedure described above applies to find the best MVPs for motion vectors MV0 and MV1. Thus, two searches of two candidate lists are performed. The determination of two MVPs for two lists increases the computational process. Two MVP indices may also be then transmitted in the bitstream, which increases overhead.

Parallel Processing of MVPs for PUs

A motion vector predictor (MVP) of a current PU is derived from motion vectors (MV) of the current PU's spatial and temporal (collocated) neighboring blocks.

FIGS. 13A and 13B show two examples where in (a), a CU contains only one PU of the same size, and in (b), a CU has two non-square PUs (PU0 and PU1). In some examples, the spatial neighboring blocks for a current PU may or may not be in the same CU where the current PU block resides. In FIG. 13A, all the spatial neighboring blocks (shown with diagonal lines) of a current PU are outside of the current CU. On the other hand, in FIG. 13B, the spatial neighboring blocks for PU0 are all outside in the current CU. But, the left spatial neighboring block for PU1 is PU0, which is inside the same current CU.

FIGS. 14A and 14B show two examples where a CU includes two PUs. In FIG. 14A, the right PU (PU1) will use the left PU (PU0) as one of the left spatial neighbors and in FIG. 14B, the bottom PU (PU1) will use the top PU (PU0) as one of the above spatial neighbors. As a result, the two PUs within a CU cannot be parallel processed; i.e., PU1 has to wait for PU0 to finish motion vector derivation before PU1 can start its own MVP derivation.

Also, a fixed order for encoding possible candidate set is used. The index number for the left spatial neighbor is always smaller than that for the above spatial neighbor no matter what kind of PU partition is. This may result in a poor coding performance for some specific PU partitions.

SUMMARY

In one embodiment, a method receives a unit of video content. The unit of video content is coded in a bi-prediction mode. A motion vector predictor candidate set is determined for a first motion vector for the unit. The method then determines a first motion vector predictor from the motion vector prediction candidate set for the first motion vector and calculates a second motion vector predictor for a second motion vector for the unit of video content. The second motion vector predictor is calculated based on the first motion vector or the first motion vector predictor.

In one embodiment, a method is provided comprising: receiving a first unit of video content; receiving a second unit of video content, wherein the first unit of video content and the second unit of video content are within a third unit of video content; determining, by a computing device, a first motion vector predictor for a first motion vector of the first unit of video content; calculating, by the computing device, a first motion vector predictor for the second unit of video content from the first motion vector predictor or the first motion vector of the first unit of video content.

In one embodiment, an apparatus is provided comprising: one or more computer processors; and a computer-readable storage medium comprising instructions, that when executed, control the one or more computer processors to be operable for: receiving a unit of video content, wherein the unit of video content is coded in a bi-prediction mode; determining a motion vector predictor candidate set for a first motion vector for the unit; determining a first motion vector predictor from the motion vector prediction candidate set for the first motion vector; and calculating a second motion vector predictor for a second motion vector for the unit of video content, the second motion vector predictor calculated based on the first motion vector or the first motion vector predictor.

In one embodiment, an apparatus is provided comprising: one or more computer processors; and a computer-readable storage medium comprising instructions, that when executed, control the one or more computer processors to be operable for: receiving a first unit of video content; receiving a second unit of video content, wherein the first unit of video content and the second unit of video content are within a third unit of video content; determining, by a computing device, a first motion vector predictor for a first motion vector of the first unit of video content; calculating, by the computing device, a first motion vector predictor for the second unit of video content from the first motion vector predictor or the first motion vector of the first unit of video content.

The following detailed description and accompanying drawings provide a better understanding of the nature and advantages of particular embodiments.

DETAILED DESCRIPTION

Described herein are techniques for a video compression system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Motion Vector Prediction Design

Figure 1:
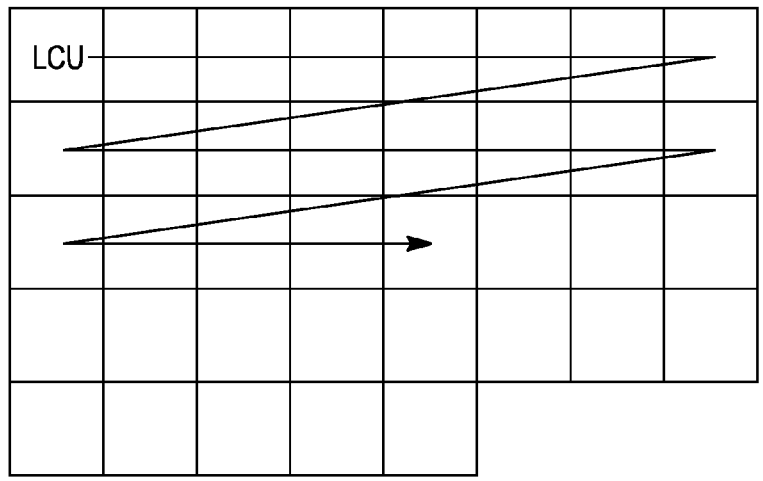
FIG. 1 shows an input picture partitioned into square blocks referred to as largest coding units (LCUs).
Figure 2:
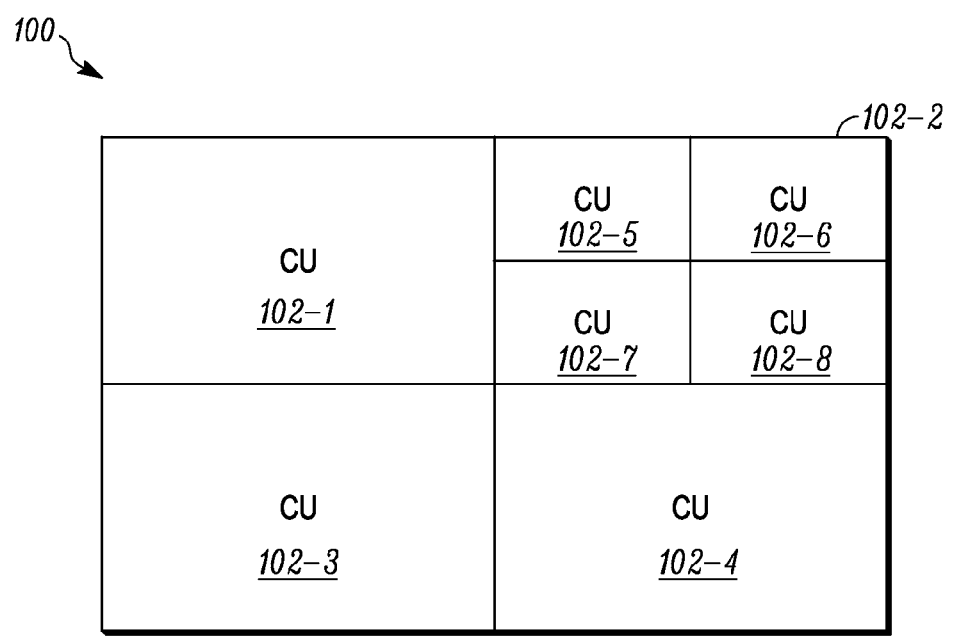
FIG. 2 shows an example of an LCU partition of CUs.
Figure 3:
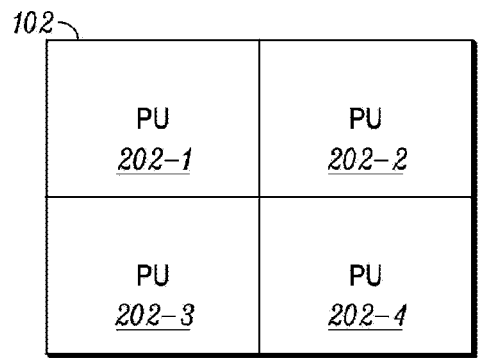
FIG. 3 shows an example of a CU partition of PUs.
Figure 4:
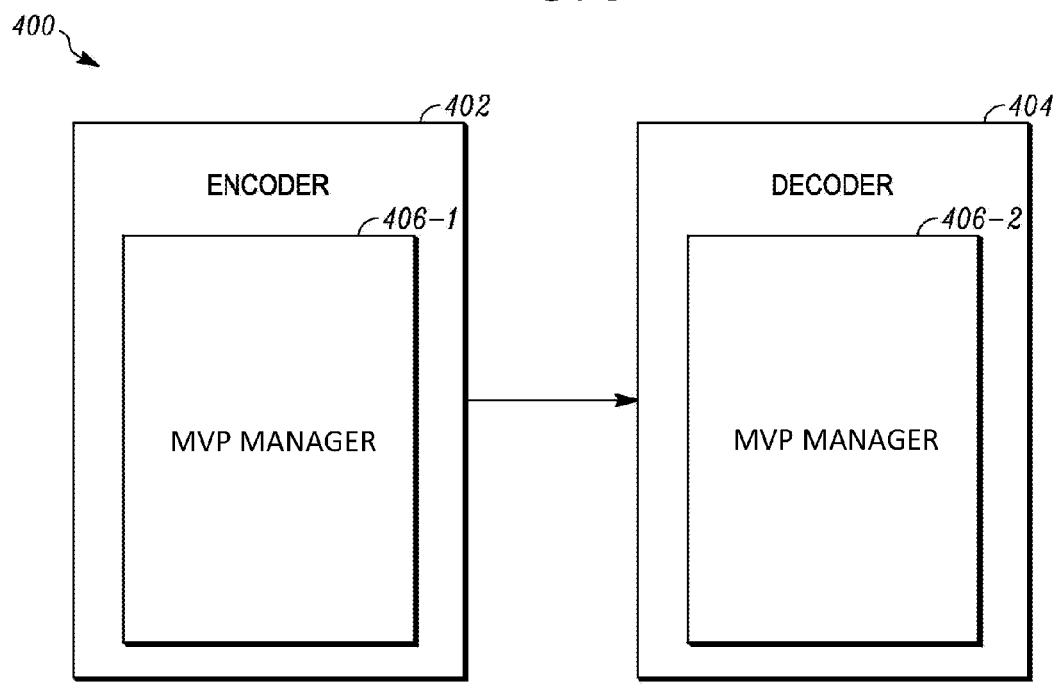
FIG. 4 depicts an example of a system for encoding and decoding video content according to one embodiment.

FIG. 4 depicts an example of a system 400 for encoding and decoding video content according to one embodiment. An encoder 402 includes a motion vector predictor (MVP) manager 406-1 and a decoder 404 includes an MVP manager 406-2. MVP managers 406 perform motion vector prediction to determine an MVP for a unit of video content, such as a PU or other block size. In one embodiment, MVP managers 406 determines two motion vectors predictor for the PU. Motion vectors MV0 and MV1 for a current picture (e.g., the PU) point to two reference pictures (or blocks) indexed by a first reference list 0 and a second reference list 1.

Particular embodiments derive a second motion vector predictor from another motion vector or another motion vector predictor. For example, MVP manager 406 first obtains a first motion vector predictor MVP_list0 for motion vector MV0. This may be calculated as described above by determining motion vectors for neighboring PUs and co-located PUs. It should be noted that the discussion will describe first motion vector predictor MVP_list 0 as being first obtained, but second motion vector predictor MVP_list1 may be first obtained. After obtaining first motion vector predictor MVP_list0, MVP manager 406 calculates a second motion vector predictor MVP_list1 from either motion vector MV0 or first motion vector predictor MVP_list0. For example, as will be described below, scaling is used to calculate second motion vector predictor MVP_list1. The scaling may be based on different characteristics, such as temporal distance or picture order count (POC).

In one embodiment, MVP manager 406 determines the MVP candidate set for motion vector MV0. The MVP candidate set may be determined using motion vectors for neighboring PUs and co-located PUs. MVP manager 406 then selects the best MVP candidate, first motion vector predictor MVP_list0 and corresponding index mvpIdx_list0, for motion vector MV0 from the MVP candidate set. The reference for current motion vector MV0 is used to identify which neighbor (spatial or temporal neighbor) PU is selected as first motion vector predictor MVP_list0. In one embodiment, first motion vector predictor MVP_list0 is also scaled if reference list 0 of motion vector MV0 is different with mvpIdx_list0 so that first motion vector predictor MVP_list0 points to the same reference picture as motion vector MV0 does. First motion vector predictor MVP_list0 below will be supposed that it is already scaled. Once the neighbor PU is selected, the reference for the neighbor PU is also known. Therefore, the mvpIdx_list0 is derived from the information of current PU.

MVP manager 406 then calculates the second MVP candidate, second motion vector predictor MVP_list1, for motion vector MV1 from either motion vector MV0 or the first motion vector predictor MVP_list0. The calculation is performed instead of selecting from a candidate set.

Temporal Distance

In one embodiment, MVP manager 406-1 uses temporal distance to calculate the second motion vector predictor MVP_list1 for motion vector MV1. A first temporal distance TR1 is between the current picture and the reference picture pointed to by motion vector MV0. A second temporal distance TR2 is between the current picture and the reference picture pointed to by motion vector MV1. The second motion vector predictor MVP_list1 for motion vector MV1 is calculated from motion vector MV0. For example, the following may be used to calculate the second motion vector predictor MVP_list1 as follows:

$$MVP\_list1=(sign)(TR2/TR1)*MV0$$

where if motion vector MV0 and motion vector MV1 both point to the past or the future, the sign is positive (+) or otherwise, the sign is negative (−). The reason the sign is used is because motion vectors MV0 and MV1 may be pointing in opposite directions and thus a negative sign needs to be applied to the scaling.

Figure 5:
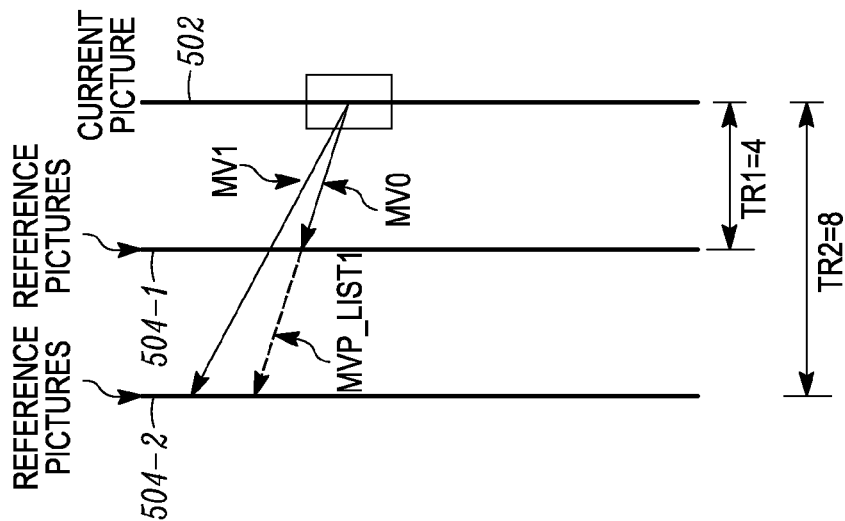
FIG. 5 shows an example where both motion vectors MV0 and MV1 point to past reference pictures according to one embodiment.

FIG. 5 shows an example where both motion vectors MV0 and MV1 point to past reference pictures according to one embodiment. A current picture 502 includes the PU being encoded. Current picture 502 is shown along with first reference picture 504-1 and second reference picture 504-2. Reference pictures 504-1 and 504-2 are in the past (have a lower display order) as compared to current picture 502. A temporal interval is shown as TR1=0 and TR2=8. This may indicate that reference picture 504-1 is four pictures in the past and reference picture 504-2 is eight pictures in the past. Other temporal distances may also be measured.

The second motion vector predictor MVP_list1 for motion vector MV1 may be calculated as:

$$MVP\_list1=(TR2/TR1)*MV0=(8/4)*MV0=MV0<<1$$

In this case, the second motion vector predictor MVP_list1 is calculated based on the temporal distance ratio of 8/4*motion vector MV0. The scaling of motion vector MV0 is used such that the second motion vector predictor MVP_list1 is shown as pointing to reference picture 504-2. The difference between motion vector MV1 and the second motion vector predictor MVP_list1 can then be calculated and coded.

Figure 6:
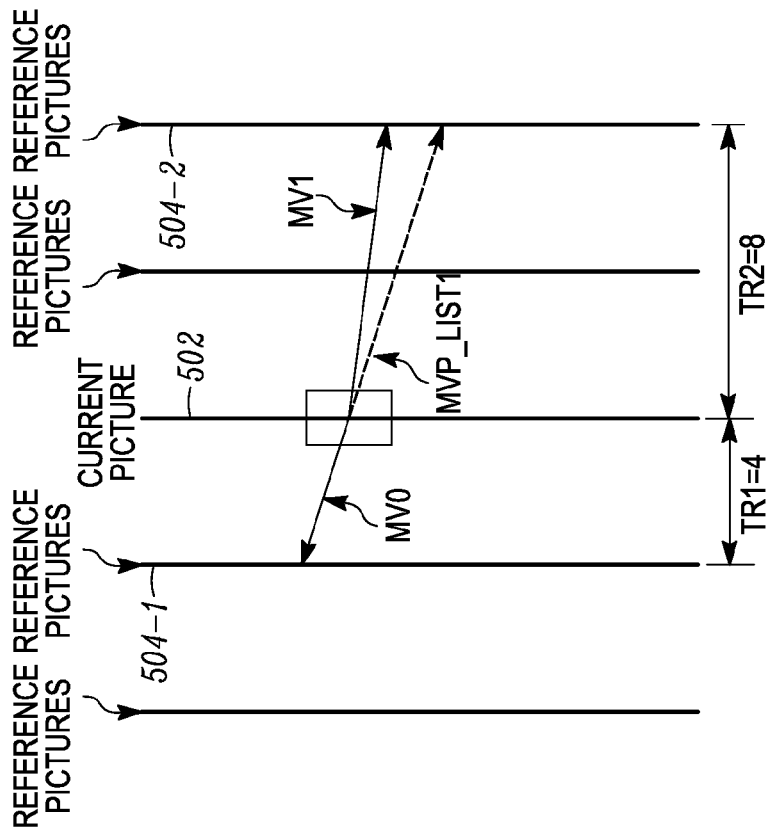
FIG. 6 shows another example where motion vector MV0 points to a past reference picture and motion vector MV1 points to a future reference picture according to one embodiment.

FIG. 6 shows another example where motion vector MV0 points to a past reference picture and motion vector MV1 points to a future reference picture according to one embodiment. The temporal difference TR1 is an interval of 4 pictures and the temporal distance TR2 is an interval of 8 pictures.

The second motion vector predictor MVP_list1 for motion vector MV1 can be determined as follows:

$$MVP\_list1=-(TR2/TR1)*MV0=-(8/4)*MV0=-(MV0<<1)$$

In this case, the second motion vector predictor MVP_list1 is equal to the negative of the scaling of motion vector MV0. This is because motion vector MV1 points to a future reference picture and not a past reference picture. As shown, the scaling of motion vector MV0 is used such that the second motion vector predictor MVP_list1 points to reference picture 504-2. In using first motion vector MV0 to calculate the second motion vector predictor MVP_list1, computational complexity is reduced.

Because a first motion vector predictor MVP_list0 is available at both encoder 402 and decoder 404, the first motion vector predictor MVP_list0 may be used instead of motion vector MV0 to calculate the second motion vector predictor MVP_list1. The following may be used to calculate the second motion vector predictor MVP_list1 as follows:

$$MVP\_list1=(sign)(TR2/TR1)*MVP\_list0$$

where TR1 is the temporal distance between the current picture and the reference picture pointed to by motion vector MV0 (in one example, first motion vector predictor MVP_list0 has been normalized by using the reference index of motion vector MV0. In other words, motion vector MV0 and first motion vector predictor MVP_list0 point to the same reference picture) and TR2 is the temporal distance between the current picture and the reference picture pointed to by motion vector MV 1. The sign is positive if the first motion vector predictor MVP_list0 and motion vector MV1 point to the past or the future. Otherwise, the sign is negative. In using first motion vector predictor MVP_list 0 to calculate the second motion vector predictor MVP_list1, computational complexity is reduced.

Accordingly, the second motion vector predictor MVP_list1 is calculated from either motion vector MV0 or the first motion vector predictor MVP_list0 instead of selecting the MVP candidate from an MVP candidate set. Thus, there is no overhead required for coding and sending an MVP index for the second list, which results in a savings in bits. Also, there is no need to implement the MVP selection procedure to determine the second MVP candidate, MVP_list1. As a result, the complexity of particular embodiments is reduced in half as compared to using an MVP selection procedure for list 1.

When encoder 402 encodes the bitstream for a current PU, MVP manager 406-1 determines the first motion vector predictor MVP_list0 using the index sent in the bitstream for first motion vector predictor MVP_list0. Then, MVP manager 406-1 may calculate the second motion vector predictor MVP_list1. For example, MVP manager 406-1 may use the methods described above to calculate the second motion vector predictor MVP_list1. Encoder 402 then determines the differences between the first motion vector MV0 and the first motion vector predictor MVP_list0 and the second motion vector MV1 and the second motion vector predictor MVP_list. Encoder 402 then sends the differences in the bitstream to decoder 404.

When decoder 404 decodes the bitstream for a current PU, MVP manager 406-2 determines the first motion vector predictor MVP_list0 using the index sent in the bitstream for first motion vector predictor MVP_list0. Then, MVP manager 406-2 may calculate the second motion vector predictor MVP_list1. For example, MVP manager 406-2 may use the methods described above to calculate the second motion vector predictor MVP_list1. Decoder 404 then determines the first motion vector MV0 using the differences sent in the bitstream using first motion vector predictor MVP_list0 and the second motion vector MV1 using the differences sent in the bitstream using the calculated motion vector predictor MVP_list1. Second motion vector predictor MVP_list1 may be a scaled version of what is calculated from first motion vector MV0 or first motion vector predictor MVP_list0. The motion vectors MV0 and MV1 may then be used in a temporal prediction process.

Other examples for calculating the second motion vector predictor MVP_list1 may be used. Other equations may also be used. For example, the following may be used:

MVP_list1=MVP0

MVP_list1=MVP_list0

Other equations may also be used. Encoder 402 and decoder 404 may select the calculation method that is used. For example, one PU may use scaling and another may use equation MVP_list1=MVP0.

MVP Candidate Calculation Using POC

In one embodiment, the picture order count (POC) may be used to derive the second motion vector predictor MVP_list1 for motion vector MV1. For a given PU, the POC for a current picture and reference pictures may be poc_curr, poc_ref_list0, and poc_ref_list1, respectively. The POC difference diff_poc_curr_list0 between the current picture and the reference picture indexed by first reference list ref_list0 is as follows:

diff_poc_curr_list0=poc_curr−poc_ref_list0 where diff_poc_curr_list0 is the difference between the current POC and the POC of the first reference picture in list 0.

Similarly, the POC difference diff_poc_curr_list1 between a current picture and a reference picture indexed by the second reference list ref_list1 is defined as follows:

diff_poc_curr_list1=poc_curr−poc_ref_list1 where diff_poc_curr_list1 is the difference between the POC of the current picture and the POC of the second reference picture list 1.

Particular embodiments determine the second motion vector predictor MVP_list1 for motion vector MV1 by scaling motion vector MV0. An example calculation can be as follows:

MVP_list1=(diff_poc_curr_list1/diff_poc_curr_list0)*MV0

Figure 7:
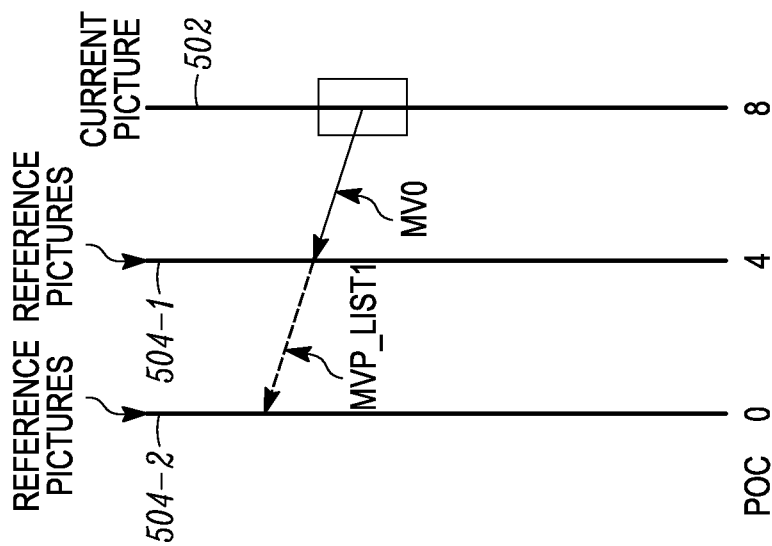
FIG. 7 shows an example where motion vectors MV0 and MV1 point to past reference pictures according to one embodiment.

FIG. 7 shows an example where motion vectors MV0 and MV1 point to past reference pictures according to one embodiment. In FIG. 7, a current picture 502 has a POC of 8. Motion vector MV0 points to a reference picture 504-1 that has a POC of 4 and a motion vector MV1 points to a reference picture 504-2 that has a POC of 0. The second motion vector predictor MVP_list1 for motion vector MV1 is calculated as:

MVP_list1=((8−0)/(8−4))MV0=MV0<<1

The scaling of motion vector MV0 is used such that the second motion vector predictor MVP_list1 is shown as pointing to reference picture 504-2. The difference between motion vector MV1 and the second motion vector predictor MVP_list1 can then be calculated and coded.

Figure 8:
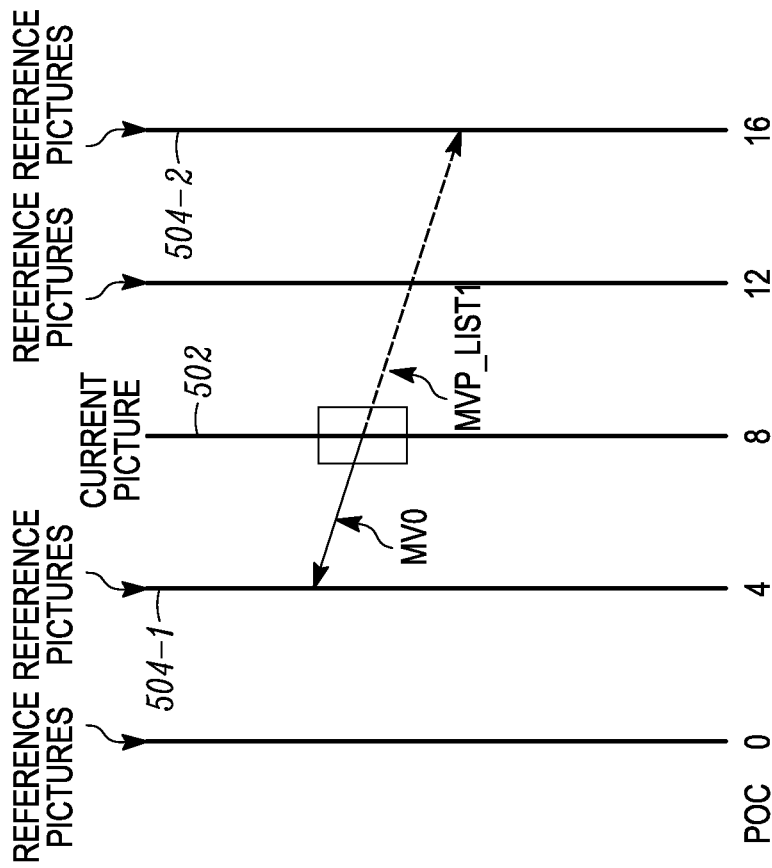
FIG. 8 shows a second example where motion vector MV0 points to a past reference picture and motion vector MV1 points to a future reference picture according to one embodiment.

FIG. 8 shows a second example where motion vector MV0 points to a past reference picture 504-1 and motion vector MV1 points to a future reference picture 504-2 according to one embodiment. The MVP candidate for motion vector MV1 is calculated as follows:

MVP_list1=((8−16)/8−4))MV0=−(MV0<<1)

As shown in FIG. 8, current picture 502 has a POC of 8, reference picture 504-1 has a POC of 4, and reference picture 504-2 has a POC of 16. The sign is negative is this case to indicate the second MVP predictor MVP_list1 is in the opposite direction of motion vector MV0.

Additionally, the other calculations described above with respect to the temporal difference can also be applied using POC. For example, motion vector predictors may be used to calculate second motion vector predictor MVP_list1.

Figure 9:
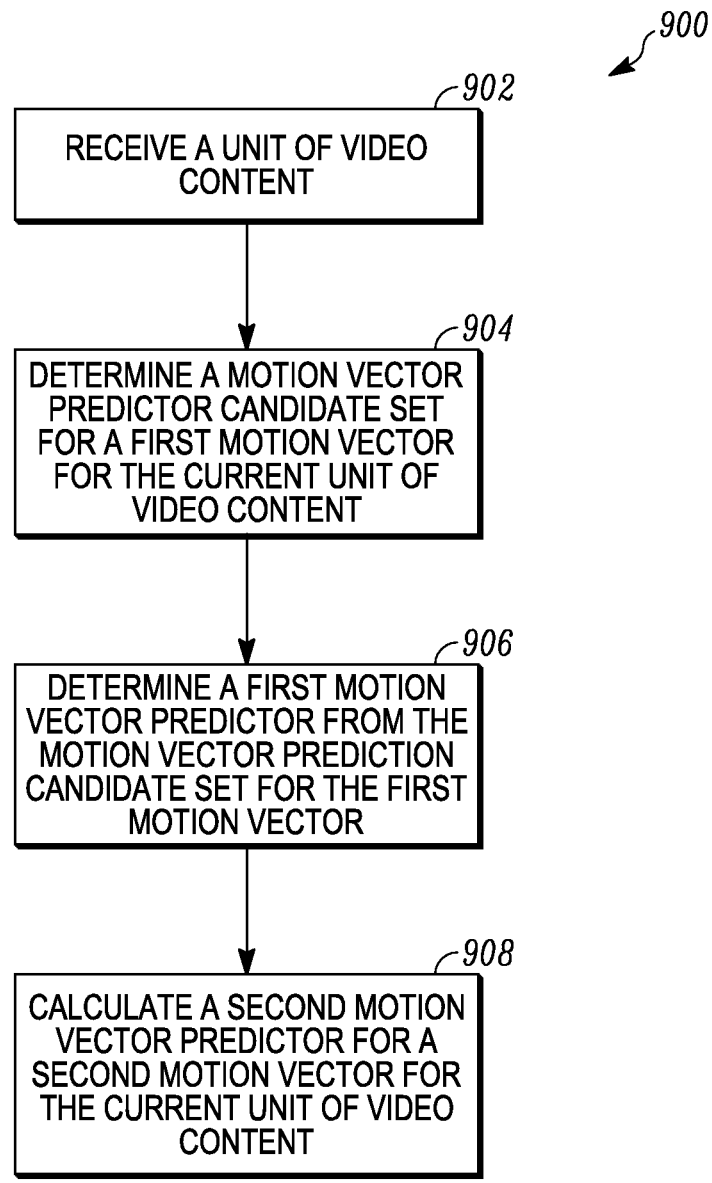
FIG. 9 depicts a simplified flowchart of a method for determining a second motion vector predictor according to one embodiment.

FIG. 9 depicts a simplified flowchart 900 of a method for determining a second motion vector predictor according to one embodiment. At 902, the method receives a current unit of video content. The current unit of video content is coded in a bi-prediction mode. At 904, the method determines a motion vector predictor candidate set for a first motion vector for the current unit of video content. At 906, a first motion vector predictor is determined from the motion vector prediction candidate set for the first motion vector. At 908, the method calculates a second motion vector predictor for a second motion vector for the current unit of video content. The second motion vector predictor is calculated based on the first motion vector or the first motion vector predictor.

MVP Calculation for Two PUs within a CU

Figure 10A:
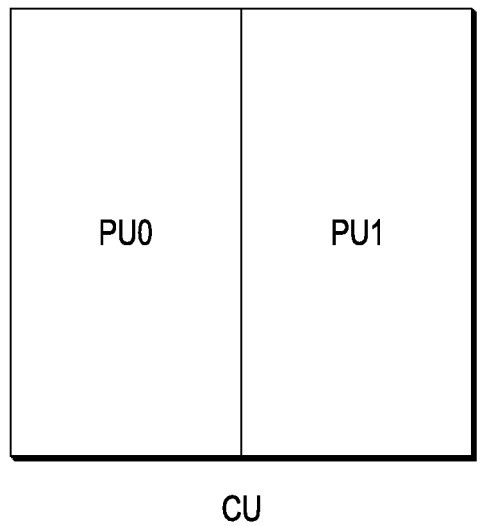
FIG. 10A and FIG. 10B depict an example of calculating first and second motion vector predictor MVP_list0 or/and MVP_list1 of the second PU based upon the information of the first PU where multiple PUs exist within a CU according to one embodiment.
Figure 10B:
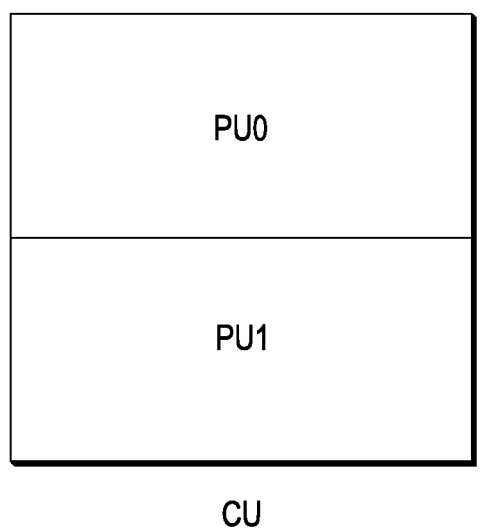

FIG. 10A and FIG. 10B depict an example of calculating first and second motion vector predictor MVP_list0 or/and MVP_list1 of the second PU based upon the information of the first PU where multiple PUs exist within a CU according to one embodiment. It will be understood that other partitioning of the CU may be appreciated. In FIGS. 10A and 10B, PU0 is considered as the first PU in the CU and is followed by PU1 in terms of coding order. These two PUs should have a high correlation and the MVPs for PU0 and PU1 may be similar.

Particular embodiments derive the MVP for PU1 from the MVP of PU0. PU0 and PU1 may be any combination of uni-prediction and bi-prediction. For example, PU0 and PU1 may both be uni-prediction, PU0 may be uni-prediction and PU1 is bi-prediction, or PU0 and PU1 are both bi-prediction. In one example, PU0 may have up to two motion vectors MV0_PU0 and MV1_PU0 that point to two reference pictures indexed by a first reference list ref_PU0_list0 and a second reference list ref_PU0_list1. Similarly, PU1 may have up to two motion vectors MV0_PU1 and MV1_PU1 that point to two reference pictures indexed by a first reference list ref_PU1_list0 and a second reference list ref_PU1_list1. First motion vector predictors MVP0_PU0 and MVP1_PU0 for PU0 are first determined, and then second motion vector predictors MVP0_PU1 and MVP1_PU1 for PU1 can then be derived from first motion vector predictors MVP0_PU0 and MVP1_PU0. The following calculation may scale first motion vector predictors MVP0_PU0 and MVP1_PU0. For example, the scaling may be based on temporal distance or POC. The following may be used to calculate the first motion vector predictor MVP0_PU1 for PU1:

MVP0_PU1=(TR0_PU1/TR0_PU0)*MVP0_PU0

Similarly, the second motion vector predictor MVP1_PU1 for PU1 is calculated from MVP1_PU0. A specific example is as follows:

MVP1_PU1=(TR1_PU1/TR1_PU0)*MVP1_PU0

In on embodiment, the above two equations, TR0_PU0 is the difference between a current picture POC and a reference picture POC pointed to by motion vector MV0_PU0, TR0_PU1 is the difference between the current picture POC and the reference picture POC pointed to by motion vector MV0_PU1, TR1_PU0 is the difference between the current picture POC and the reference picture POC pointed to by MV1_PU0, and TR1_PU1 is the difference between the current picture POC and the reference picture POC pointed to by motion vector MV1_PU1. Other temporal differences may also be used.

A PU may not use both reference list 0 and reference list 1. For example, PU0 may only use either reference list 0 or reference list 1. On the other hand, PU1 may still use both reference list 0 and reference list 1. In this case, second motion vector predictors MVP0_PU1 and MVP1_PU1 can be derived from either first motion vector predictors MVP0_PU0 or MVP1_PU0. For example, if only MVP0_PU0 is available, second motion vector predictors MVP0_PU1 and MVP1_PU1 can be determined as follows:

MVP0_PU1=(TR0_PU1/TR0_PU0)*MVP0_PU0

MVP1_PU1=(TR1_PU1/TR0_PU0)*MVP0_PU0

Figure 11:
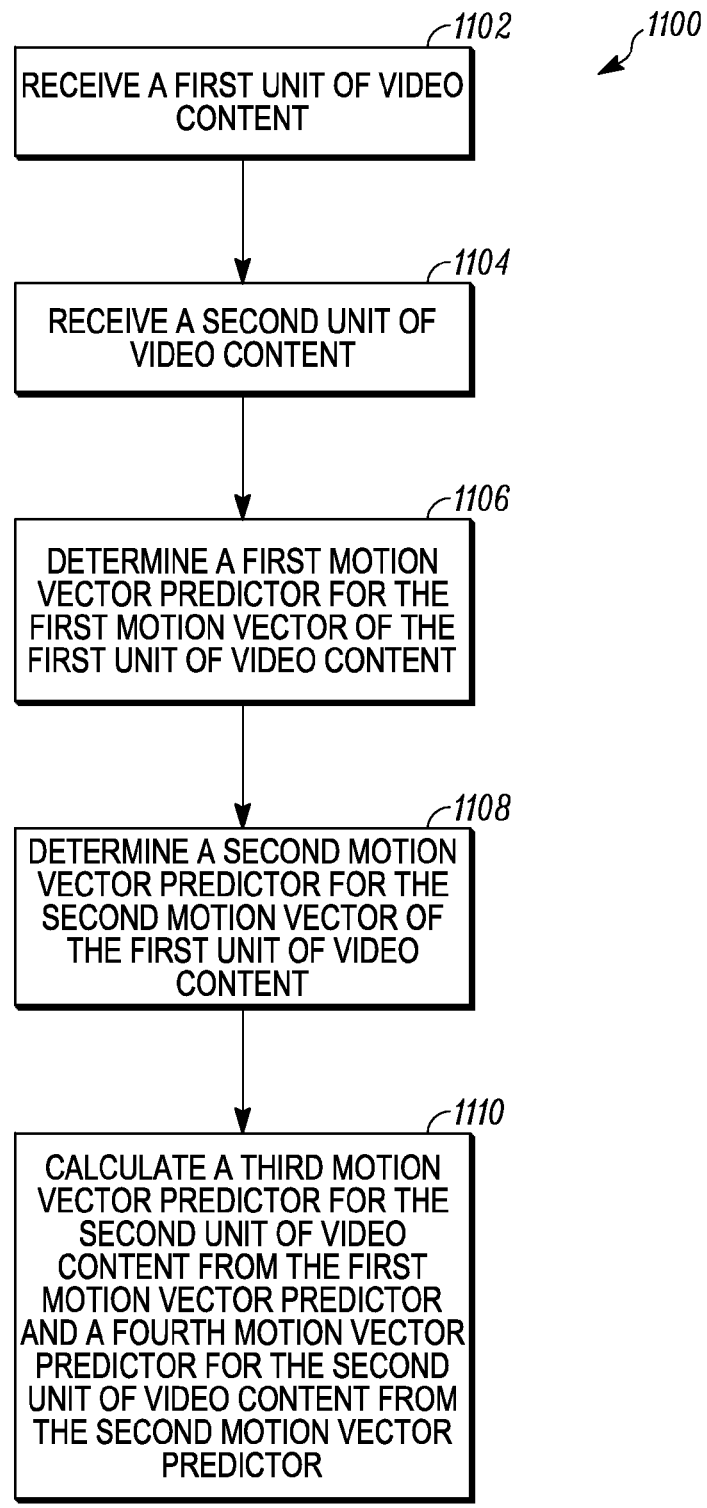
FIG. 11 depicts a simplified flowchart of a method for determining MVPs when two PUs are found in a coding unit according to one embodiment.

In another case, if both PUs are in uni-prediction, if only MVP0_PU0 is available, second motion vector predictor MVP0_PU1 is determined from MVP0_PU0. FIG. 11 depicts a simplified flowchart 1100 of a method for determining MVPs when two PUs are found in a coding unit according to one embodiment. At 1102, the method receives a first unit of video content. At 1104, the method receives a second unit of video content. The first unit of video content (PU0) and the second unit of video content (PU1) are within a third unit of video content (CU). The first or second unit of video content may be coded in a uni-prediction or bi-prediction mode. This example is where both units are in bi-prediction, but other examples will be appreciated. At 1106, a first motion vector predictor is determined for the first motion vector of the first unit of video content. At 1108, a second motion vector predictor is determined for the second motion vector of the first unit of video content. At 1110, the method calculates a first motion vector predictor for the second unit of video content from the first motion vector predictor of the first unit of video content and a second motion vector predictor for the second unit of video content from the second motion vector predictor of the first unit of video content.

Encoder and Decoder Examples

Figure 12A:
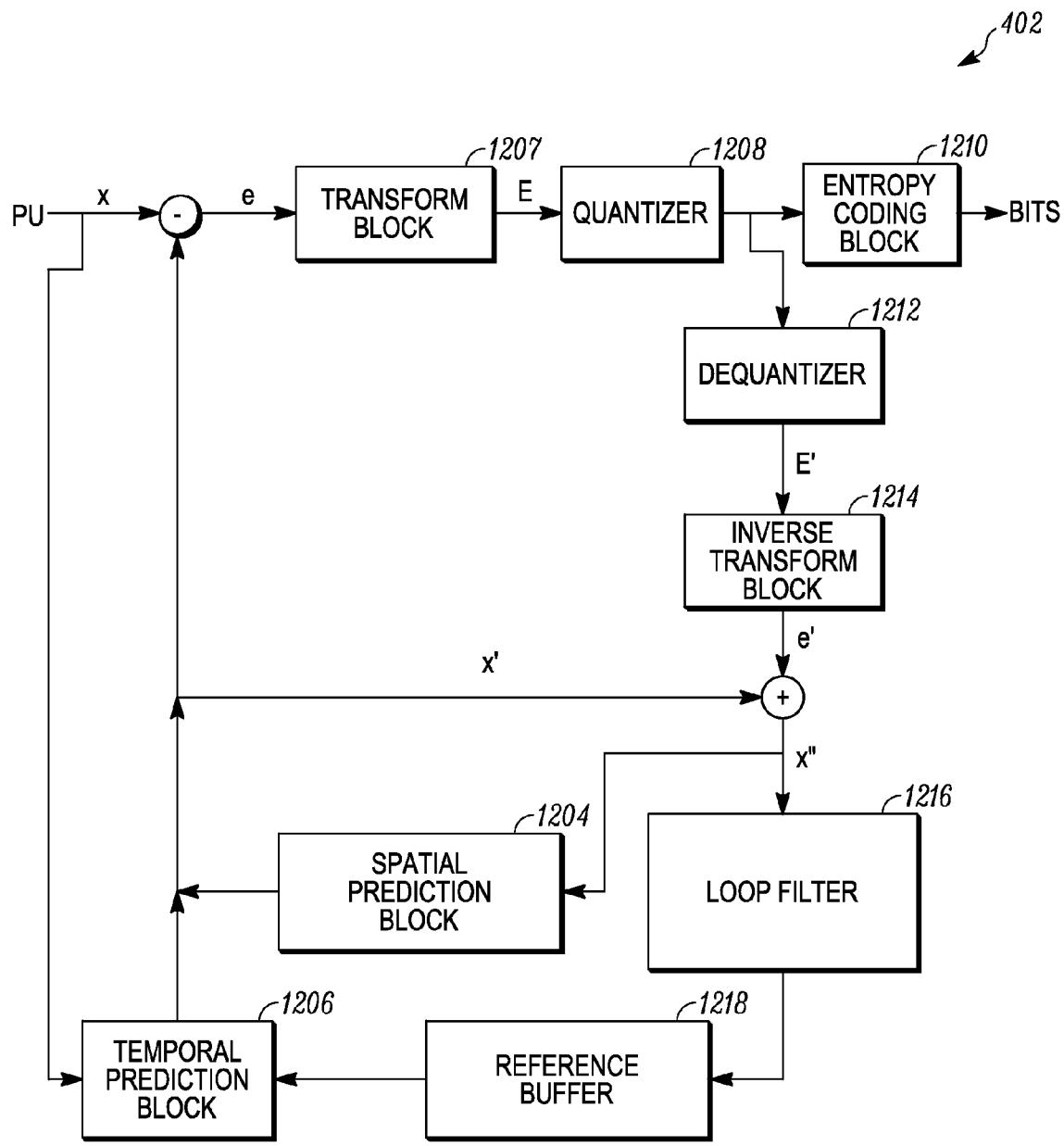
FIG. 12A depicts an example of encoder according to one embodiment.

FIG. 12A depicts an example of encoder 402 according to one embodiment. A general operation of encoder 402 will now be described; however, it will be understood that variations on the encoding process described will be appreciated by a person skilled in the art based on the disclosure and teachings herein.

For a current PU, x, a prediction PU, x', is obtained through either spatial prediction or temporal prediction. The prediction PU is then subtracted from the current PU, resulting in a residual PU, e. A spatial prediction block 1204 may include different spatial prediction directions per PU, such as horizontal, vertical, 45-degree diagonal, 135-degree diagonal, DC (flat averaging), and planar.

Temporal prediction block 1206 performs temporal prediction through a motion estimation operation. The motion estimation operation searches for a best match prediction for the current PU over reference pictures. The best match prediction is described by a motion vector (MV) and associated reference picture (refIdx). The motion vector and associated reference picture are included in the coded bit stream.

Transform block 1207 performs a transform operation with the residual PU, e. Transform block 1207 outputs the residual PU in a transform domain, E.

A quantizer 1208 then quantizes the transform coefficients of the residual PU, E. Quantizer 1208 converts the transform coefficients into a finite number of possible values. Entropy coding block 1210 entropy encodes the quantized coefficients, which results in final compression bits to be transmitted. Different entropy coding methods may be used, such as context-adaptive variable length coding (CAVLC) or context-adaptive binary arithmetic coding (CABAC).

Also, in a decoding process within encoder 402, a de-quantizer 1212 de-quantizes the quantized transform coefficients of the residual PU. De-quantizer 1212 then outputs the de-quantized transform coefficients of the residual PU, E'. An inverse transform block 1214 receives the de-quantized transform coefficients, which are then inverse transformed resulting in a reconstructed residual PU, e'. The reconstructed PU, e', is then added to the corresponding prediction, x', either spatial or temporal, to form the new reconstructed PU, x". A loop filter 1216 performs de-blocking on the reconstructed PU, x", to reduce blocking artifacts. Additionally, loop filter 1216 may perform a sample adaptive offset process after the completion of the de-blocking filter process for the decoded picture, which compensates for a pixel value offset between reconstructed pixels and original pixels. Also, loop filter 1216 may perform adaptive loop filtering over the reconstructed PU, which minimizes coding distortion between the input and output pictures. Additionally, if the reconstructed pictures are reference pictures, the reference pictures are stored in a reference buffer 1218 for future temporal prediction.

Figure 12B:
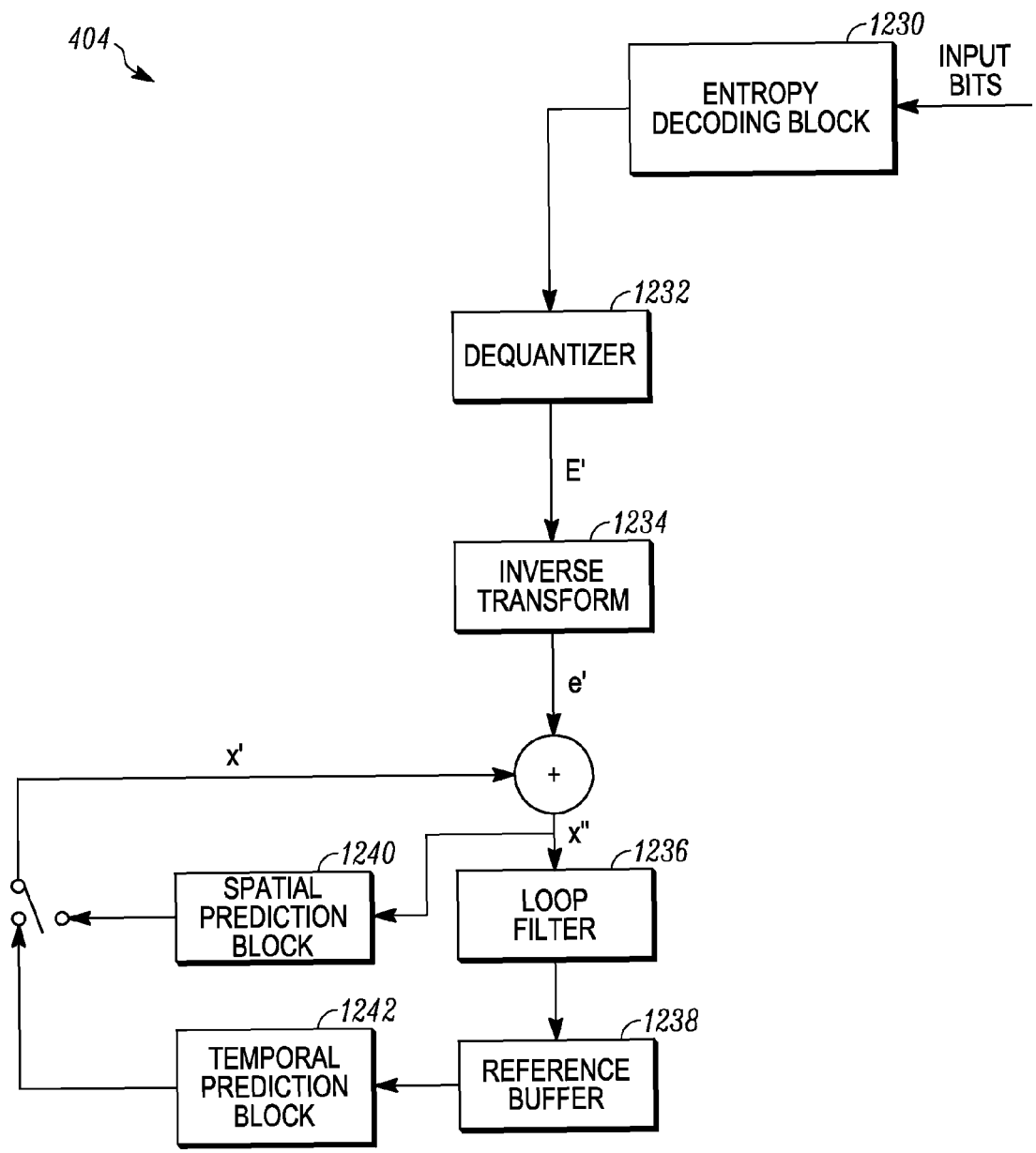
FIG. 12B depicts an example of decoder according to one embodiment.
Figure 13A:
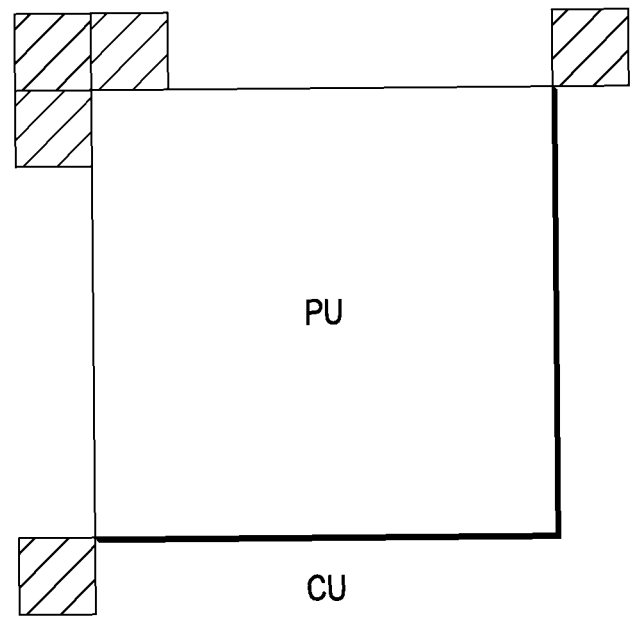
FIGS. 13A and 13B show two examples where in (a), a CU contains only one PU of the same size, and in (b), a CU has two non-square PUs (PU0 and PU1).
Figure 13B:
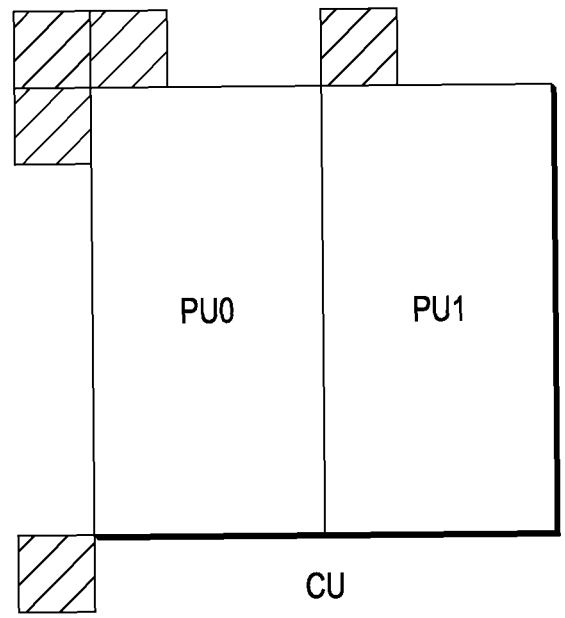

FIG. 12B depicts an example of decoder 404 according to one embodiment. A general operation of decoder 401 will now be described; however, it will be understood that variations on the decoding process described will be appreciated by a person skilled in the art based on the disclosure and teachings herein. Decoder 404 receives input bits from encoder 400 for encoded video content.

An entropy decoding block 1230 performs entropy decoding on the input bitstream to generate quantized transform coefficients of a residual PU. A de-quantizer 1232 de-quantizes the quantized transform coefficients of the residual PU. De-quantizer 1232 then outputs the de-quantized transform coefficients of the residual PU, E'. An inverse transform block 1234 receives the de-quantized transform coefficients, which are then inverse transformed resulting in a reconstructed residual PU, e'.

The reconstructed PU, e', is then added to the corresponding prediction, x', either spatial or temporal, to form the new reconstructed PU, x". A loop filter 1236 performs de-blocking on the reconstructed PU, x", to reduce blocking artifacts. Additionally, loop filter 1236 may perform a sample adaptive offset process after the completion of the de-blocking filter process for the decoded picture, which compensates for a pixel value offset between reconstructed pixels and original pixels. Also, loop filter 1236 may perform adaptive loop filtering over the reconstructed PU, which minimizes coding distortion between the input and output pictures. Additionally, if the reconstructed pictures are reference pictures, the reference pictures are stored in a reference buffer 1238 for future temporal prediction.

The prediction PU, x', is obtained through either spatial prediction or temporal prediction. A spatial prediction block 1240 may receive decoded spatial prediction directions per PU, such as horizontal, vertical, 45-degree diagonal, 135-degree diagonal, DC (flat averaging), and planar. The spatial prediction directions are used to determine the prediction PU, x'.

A temporal prediction block 1206 performs temporal prediction through a motion estimation operation. A decoded motion vector is used to determine the prediction PU, x'. Interpolation may be used in the motion estimation operation.

Parallel Processing of MVPs for PUs

Figure 14A:
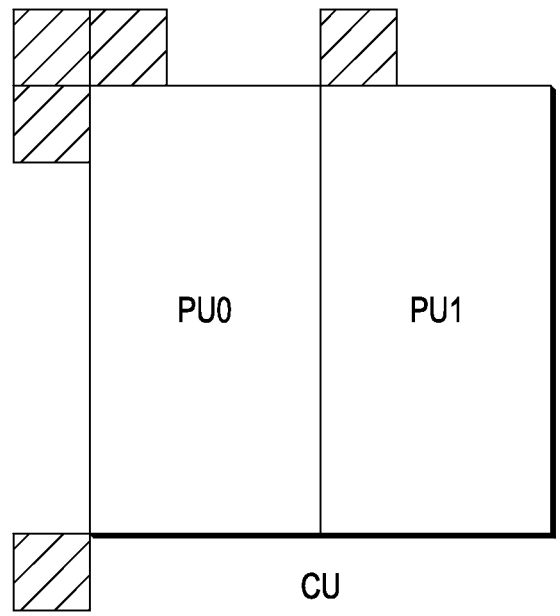
FIGS. 14A and 14B show two examples where a CU includes two PUs.
Figure 14B:
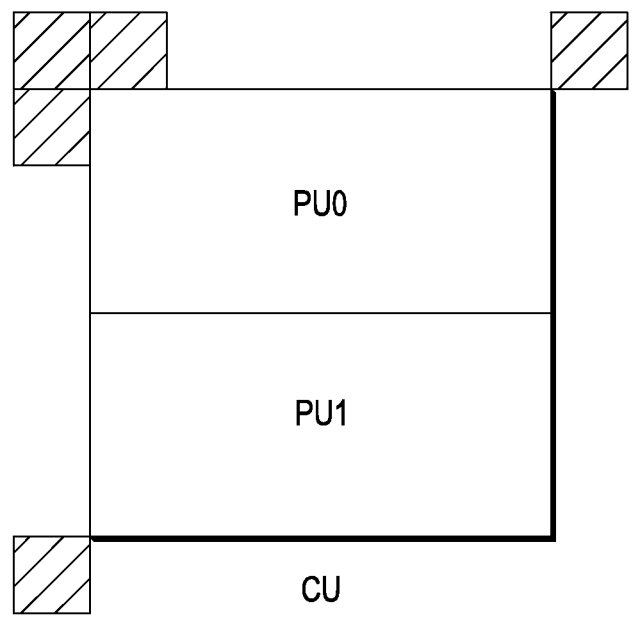

In one embodiment, if there are two PUs within one CU, MVP manager 406 processes these two PUs in parallel. However, conventionally, the right PU in FIG. 14A or the bottom PU in FIG. 14B were not parallel processed because they have to use the left or the above PU in the same CU as one of spatial neighbors. Particular embodiments only use PUs in spatial neighboring CUs as spatial candidates for a current PU. This way, MVP manager 406 parallel processes PUs in the same CU.

Figure 15A:
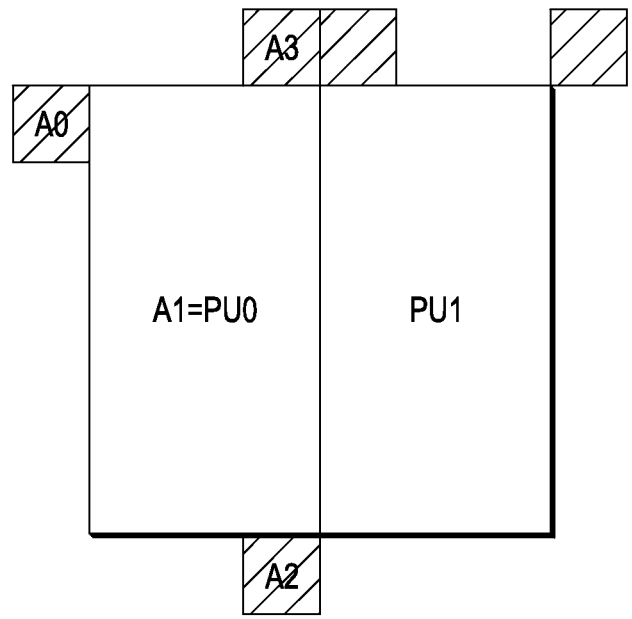
FIGS. 15A and 15B depict an example of blocks to use as candidates according to one embodiment.
Figure 15B:
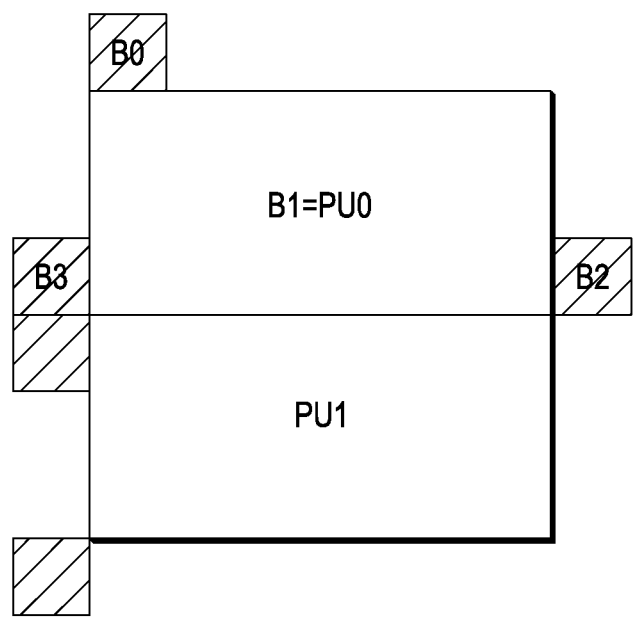

FIGS. 15A and 15B depict an example of blocks to use as candidates according to one embodiment. In FIG. 15A, a block A0, instead of block A1 (i.e., PU0), is used as the left spatial block for the right PU (i.e., PU1). Blocks A2 and A3 are still treated as the left-bottom and the left-above blocks for the right PU (PU1). Similarly, in FIG. 15B, block B0, instead of block B1 (i.e., PU0), is used as the above spatial block for the bottom PU (i.e., PU1), and blocks B2 and B3 are treated as the above-right and the above-left blocks for the bottom PU (PU1). Thus, PU0 is not used as a spatial neighboring block in the processing of PU1 to find an MVP. This allows PU0 and PU1 to be parallel processed to find the motion vector predictor for PU0 and PU1. In an alternative embodiment, MVP manager 406 treats the left neighbor in the example of FIG. 14A and the above neighbor in the example of FIG. 14B as not available. Thus, these two neighbors are not used in the MVP calculation and PU0 and PU1 can be parallel processed.

In order to improve the coding performance, particular embodiments may modify indexing of spatial and temporal neighbors. More specifically, if there is only one PU within one CU, the current indexing is kept unchanged, where the index for the left neighbor block is smaller than that for the above neighbor block.

If there are two PUs within one CU, the index for the left and the above block may be swapped. The swapping may depend on different factors, such as on PU partition types. For example, FIGS. 15A and 15B show different partition types according to one embodiment. In FIG. 15A, if the PU types are N×2N, nL×2N, or nR×2N, for the left PU (i.e., PU0), the index for the left neighboring block (i.e., A0) may be assigned a smaller number than that for the above neighboring block (i.e., A3), and for the right PU (i.e., PU1), the index for the above neighboring block (i.e., A3) may be assigned a smaller number than that for the left neighboring block (i.e., A0).

In FIG. 15B, if the PU types are 2N×N, 2N×nU or 2N×nD, for the above PU (i.e., PU0), the index for the above neighboring block (i.e., B0) may be assigned a smaller number than that for the left neighboring block (i.e., B3), and for the bottom PU (i.e., PU1), the index for the left neighboring block (i.e., B3) may be assigned a smaller number than that for the above neighboring block (i.e., B0).

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
receiving a first prediction block of video content;
receiving a second prediction block of video content, wherein the second prediction block is coded in a bi-prediction mode and wherein the first prediction block and the second prediction block are spatial neighboring blocks within a first coding unit of video content; and
parallel processing the first prediction block and the second prediction block by determining a motion vector prediction candidate set for a first motion vector of the first prediction block using motion vectors of temporal and spatial neighboring blocks excluding a first motion vector of the second prediction block while performing the following processing for the second prediction block:
determining a motion vector predictor candidate set for the first motion vector of the second prediction block using motion vectors of temporal and spatial neighboring blocks excluding the first motion vector of the first prediction block;
determining, by a computing device, a first motion vector predictor from the motion vector prediction candidate set for the first motion vector of the second prediction block; and
calculating, by the computing device, a second motion vector predictor for a second motion vector of the second prediction block, the second motion vector predictor calculated based on the first motion vector of the second prediction block or the first motion vector predictor.

2. The method of claim 1, wherein the second motion vector predictor is calculated based on a scaling of the first motion vector of the second prediction block or the first motion vector predictor.

3. The method of claim 1, wherein the second motion vector predictor is calculated based on a first temporal distance between the second prediction block and a first reference picture pointed to by the first motion vector of the second prediction block and a second temporal distance between the second prediction block and a second reference picture pointed to by the second motion vector of the second prediction block.

4. The method of claim 3, wherein the second motion vector predictor is calculated by scaling the first motion vector of the second prediction block or the first motion vector predictor by a ratio of the second temporal distance and the first temporal distance.

5. The method of claim 1, wherein the second motion vector predictor is calculated based on a first picture order count (POC) difference between the second prediction block and a first reference picture pointed to by the first motion vector of the second prediction block and a second picture order count difference between the second prediction block and a second reference picture pointed to by the second motion vector of the second prediction block.

6. The method of claim 5, wherein the second motion vector predictor is calculated by scaling the first motion vector of the second prediction block or the first motion vector predictor by a ratio of the second POC difference and the first POC difference.

7. The method of claim 1 wherein the first prediction block is to the left of the second prediction block within the first coding unit and wherein determining the motion vector predictor candidate set for the first motion vector of the second prediction block comprises determining the motion vector predictor candidate set for the first motion vector of the second prediction block using a motion vector of a spatial neighboring block to the first prediction block within a second coding unit of video content to the right of the first prediction block.

8. The method of claim 7, further comprising:
assigning, to the spatial neighboring block to the first prediction block within the second coding unit of video content to the right of the first prediction block, a first index number within the motion vector predictor candidate set for the first motion vector of the first prediction block;
assigning, to a spatial neighboring block to the first prediction block within a third coding unit of video content above the first prediction block, a second index number within the motion vector prediction candidate set for the first motion vector of the first prediction block, wherein the first index number is smaller than the second index number;
assigning, to the spatial neighboring block to the first prediction block within the third coding unit of video content above the first prediction block, a third index number within the motion vector prediction candidate set for the first motion vector of the second prediction block; and
assigning, to the spatial neighboring block to the first prediction block within the second coding unit of video content to the right of the first prediction block, a fourth index number within the motion vector predictor candidate set for the first motion vector of the first prediction block, wherein the third index number is smaller than the fourth index number.

9. The method of claim 1 wherein the first prediction block is above the second prediction block within the first coding unit and wherein determining the motion vector predictor candidate set for the first motion vector of the second prediction block comprises determining the motion vector predictor candidate set for the first motion vector of the second prediction block using a motion vector of a spatial neighboring block to the first prediction block within a second coding unit of video content above the first prediction block.

10. The method of claim 9, further comprising:
assigning, to the spatial neighboring block to the first prediction block within the second coding unit of video content above the first prediction block, a first index number within the motion vector predictor candidate set for the first motion vector of the first prediction block;
assigning, to a spatial neighboring block to the first prediction block within a third coding unit of video content to the left of the first prediction block, a second index number within the motion vector prediction candidate set for the first motion vector of the first prediction block, wherein the first index number is smaller than the second index number;
assigning, to the spatial neighboring block to the first prediction block within the third coding unit of video content to the left of the first prediction block, a third index number within the motion vector prediction candidate set for the first motion vector of the second prediction block; and
assigning, to the spatial neighboring block to the first prediction block within the second coding unit of video content above the first prediction block, a fourth index number within the motion vector predictor candidate set for the first motion vector of the first prediction block, wherein the third index number is smaller than the fourth index number.

11. The method of claim 1 wherein:
determining the motion vector prediction candidate set for the first motion vector of the first prediction block using motion vectors of temporal and spatial neighboring blocks uses a temporal neighboring block and only spatial neighboring blocks of spatial neighboring coding units to the first coding unit; and
determining the motion vector predictor candidate set for the first motion vector of the second prediction block using motion vectors of temporal and spatial neighboring blocks uses a temporal neighboring block and only spatial neighboring blocks of spatial neighboring coding units to the first coding unit.

12. The method of claim 1, further comprising:
coding the first motion vector of the first prediction block using an entry from the motion vector predictor candidate set for the first motion vector of the first prediction block; and
coding the first motion vector of the second prediction block using an entry from the motion vector predictor candidate set for the first motion vector of the second prediction block.

13. An apparatus comprising:
one or more computer processors; and
a non-transitory computer-readable storage medium comprising instructions, that when executed, control the one or more computer processors to be operable for:
receiving a first prediction block of video content;
receiving a second prediction block of video content, wherein the second prediction block is coded in a bi-prediction mode and wherein the first prediction block and the second prediction block are spatial neighboring blocks within a single coding unit of video content; and
parallel processing the first prediction block and the second prediction block by determining a motion vector prediction candidate set for a first motion vector of the first prediction block using motion vectors of temporal and spatial neighboring blocks excluding a first motion vector of the second prediction block while performing the following processing for the second prediction block;
determining a motion vector predictor candidate set for the first motion vector for the second prediction block using motion vectors of temporal and spatial neighboring blocks excluding the first motion vector for the first prediction block;
determining a first motion vector predictor from the motion vector prediction candidate set for the first motion vector of the second prediction block; and
calculating a second motion vector predictor for a second motion vector of the second prediction block, the second motion vector predictor calculated based on the first motion vector or the first motion vector predictor of the second prediction block.

14. The apparatus of claim 13, wherein the second motion vector predictor is calculated based on a scaling of the first motion vector of the second prediction block or the first motion vector predictor.

15. The apparatus of claim 13, wherein the second motion vector predictor is calculated based on a first temporal distance between the second prediction block and a first reference picture pointed to by the first motion vector of the second prediction block and a second temporal distance between the second prediction block and a second reference picture pointed to by the second motion vector of the second prediction block.

16. The apparatus of claim 13, wherein the second motion vector predictor is calculated based on a first picture order count (POC) difference between the second prediction block and a first reference picture pointed to by the first motion vector of the second prediction block and a second picture order count difference between the second prediction block and a second reference picture pointed to by the second motion vector of the second prediction block.

17. The apparatus of claim 13 wherein the first motion vector for the first prediction block is coded using an entry from the motion vector predictor candidate set for the first motion vector of the first prediction block, and the first motion vector for the second prediction block is coded using an entry from the motion vector predictor candidate set for the first motion vector of the second prediction block.

18. The apparatus of claim 13 wherein:
the spatial neighboring blocks used to determine the motion vector prediction candidate set for the first motion vector of the first prediction block are only spatial neighboring blocks of spatial neighboring coding units to the first coding unit; and
the spatial neighboring blocks used to determine the motion vector predictor candidate set for the first motion vector of the second prediction block are only spatial neighboring blocks of spatial neighboring coding units to the first coding unit.

19. The apparatus of claim 13 wherein:
the first prediction block is to the left of the second prediction block within the first coding unit;
the spatial neighboring blocks used to determine the motion vector prediction candidate set for the first motion vector of the first prediction block include a first spatial neighboring block within a second coding unit to the left of the first coding unit and a second spatial neighboring block within a third coding unit above the first coding unit;
the first spatial neighboring block and the second spatial neighboring block is used to determine the motion vector prediction candidate set for the first motion vector of the second prediction block; and
an index of the first spatial neighboring block is assigned a smaller number than the second spatial neighboring block within the motion vector prediction candidate set for the first motion vector of the first prediction block and is assigned a larger number than the second spatial neighboring block within the motion vector prediction candidate set for the first motion vector of the second prediction block.

20. The apparatus of claim 13 wherein:
the first prediction block is to the left of the second prediction block within the first coding unit;
the spatial neighboring blocks used to determine the motion vector prediction candidate set for the first motion vector of the first prediction block include a first spatial neighboring block within a second coding unit to the left of the first coding unit and a second spatial neighboring block within a third coding unit above the first coding unit;
the first spatial neighboring block and the second spatial neighboring block is used to determine the motion vector prediction candidate set for the first motion vector of the second prediction block; and
an index of the first spatial neighboring block is assigned a smaller number than the second spatial neighboring block within the motion vector prediction candidate set for the first motion vector of the first prediction block and is assigned a larger number than the second spatial neighboring block within the motion vector prediction candidate set for the first motion vector of the second prediction block.

* * * * *